No. 722,345. PATENTED MAR. 10, 1903.
J. E. WOODBRIDGE.
SYNCHRONISM INDICATOR.
APPLICATION FILED JULY 30, 1900.
NO MODEL.
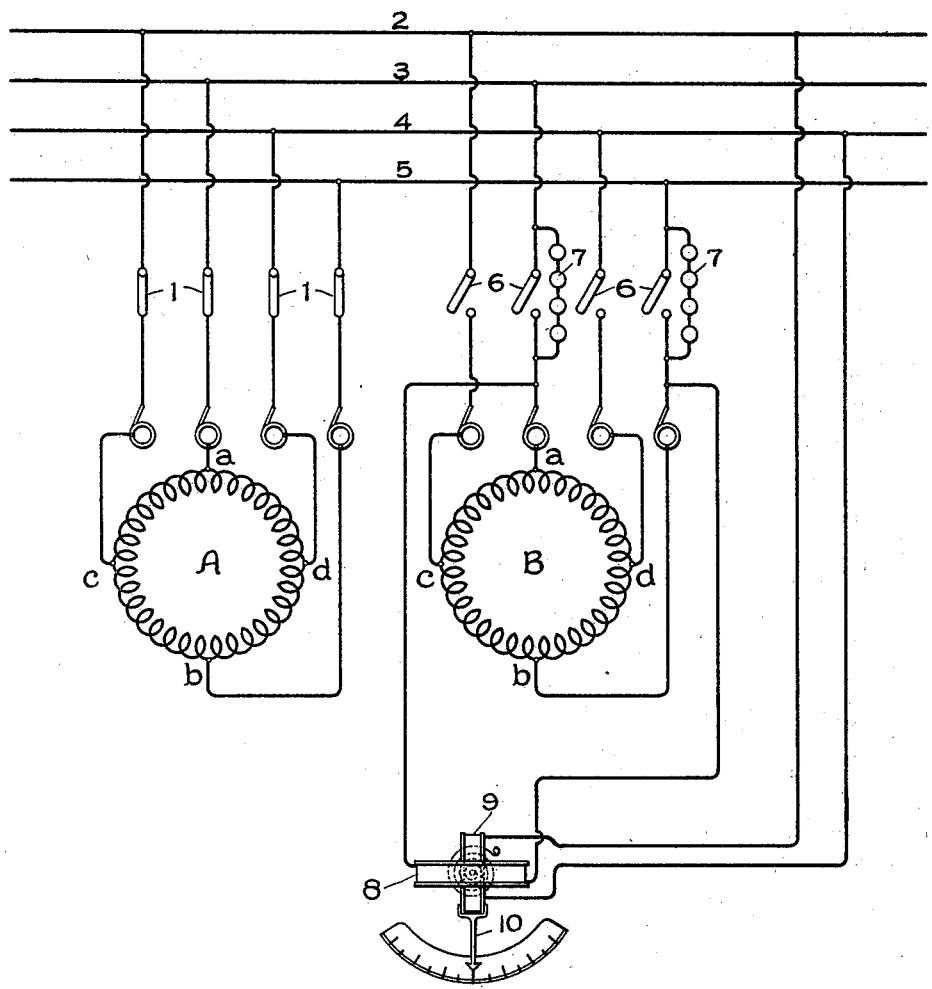
Witnesses:
Lewis T. Abell
Benjamin B. Hull
Inventor.
Jonathan E. Woodbridge
by Albert G. Davis
Atty.

UNITED STATES PATENT OFFICE.

JONATHAN E. WOODBRIDGE, OF SCHENECTADY, NEW YORK, ASSIGNOR TO GENERAL ELECTRIC COMPANY, A CORPORATION OF NEW YORK.

SYNCHRONISM-INDICATOR.

SPECIFICATION forming part of Letters Patent No. 722,345, dated March 10, 1903.

Application filed July 30, 1900. Serial No. 25,264. (No model.)

*To all whom it may concern:*

Be it known that I, JONATHAN E. WOODBRIDGE, a citizen of the United States, residing at Schenectady, county of Schenectady, State of New York, have invented certain new and useful Improvements in Synchronism-Indicators, of which the following is a specification.

My present invention relates to the sychronizing of alternating-current machines, and comprises certain improvements for determining the proper moment for throwing machines in parallel with much greater accuracy than is obtainable by the methods now in common use.

It is the common practice to compare electromotive forces derived, respectively, from the machines to be synchronized, these electromotive forces being either in phase with each other or in opposition when the machines from which they are derived are in proper phase relation for connecting them in parallel. The indications due to the resultant electromotive forces in these cases cannot be read with such accuracy as is in many cases necessary. Thus when the electromotive forces are in phase with and additive to each other their resultant changes very slightly with considerable changes in their phase angle. This method of synchronizing is known as "synchronizing bright," since if lamps are used for the indicating device they will burn at maximum brilliancy when the electromotive forces are in phase. The practice known as "synchronizing dark" implies the comparison of electromotive forces which come into exact opposition when the machines to be synchronized come into phase with each other. It is evident in this case that as the machines approach the proper phase relation for throwing together the voltages are difficult to observe either by phase-lamps or by the ordinary alternating-current voltmeter, in which the scale is contracted in the region of low voltages.

As distinguished from the ordinary methods of synchronizing above referred to I make use of electromotive forces which are normally out of phase with each other when the machines to which they are due are in phase.

The apparatus which I find convenient to use consists of a dynamometer instrument having two relatively movable coils, one of which is connected across one phase of one of the machines and the other across another phase of the other machine. When the machines are in phase with each other, the movable part of the instrument will be subjected to a series of equal alternating impulses, which balance each other and cause no tendency to motion in either direction. Supposing, for example, the machines to be synchronized are of the quarter-phase type, then when one is displaced ninety degrees in phase in one direction from the other the synchronizing instrument will have a maximum torque in one direction, while if the phase displacement is ninety degrees in the opposite direction the synchronizing instrument will have a maximum torque in the other direction. As the machines approach and recede from the relative position corresponding to synchronism the movable member of the synchronizing device will swing back and forth over the scale and by its position on the scale will indicate the changes in phase relation between the machines. When the pointer or other indicating device of the synchronizing instrument passes the zero or middle point of the scale, the machines to be synchronized are in phase with each other. Since at this time the needle is in the middle point of its swing, its velocity at this moment is a maximum, thereby giving accurate indication of the proper moment for throwing the machines together and by its movement signifying sensitively any difference in speed between the machines.

My invention will be better understood by reference to the following description, taken in connection with the accompanying drawing, while its points of novelty will be set forth in the claims appended hereto.

In the drawing I have illustrated my invention in connection with alternating-current generators of the quarter-phase type.

One of the generators A is shown as connected through suitable switches 1 to a set of quarter-phase mains 2, 3, 4, and 5. Another quarter-phase generator B, similar to the machine A, is arranged to be connected, by means of switches 6, to the same quarter-phase mains, these switches, however, being shown in the open position instead of closed, as in the case of the first machine. The usual phase-lamps 7 are connected in the usual manner in series with one phase of the machine B, so as to indicate whether the machine is in conjunction or in opposition with respect to the electromotive forces of the mains 2 to 5, inclusive. These lamps are necessary, since the synchronizing device, above referred to and about to be described in detail, gives the same indication whether the machine to be synchronized is in conjunction or opposition with respect to the machine or mains with which it is to be connected.

The synchronizing-volt meter which I prefer to employ is of the dynamometer type having two relatively movable coils 8 9 normally at right angles with each other. A pointer 10 is carried by the movable coil and is set normally at a zero position situated at the middle of the scale 11. A suitable spring or springs tends to bring the coil back to its zero position after it has been deflected. One of the coils—as, for example, the coil 8—is connected across one of the phases of the machine B—as, for example, the phase $a\,b$. The other coil 9 is connected across the other phase $c\,d$ of the machine A. The electromotive forces impressed upon these coils therefore differ in phase by ninety degrees when the machines to which they are due are in phase with each other. In synchronizing the machines the needle of the synchronizing instrument will swing backward and forward across its zero position as the machines alternately come into and out of phase with each other, and the proper moment for throwing the machines together is represented by the instant when the needle passes its zero position, provided, however, that the phase-lamps at this instant are dark, indicating that the electromotive forces of the two machines are in exact opposition to each other, and therefore in the proper relation for parallel operation. It is obvious that if the instrument is deflected in one direction—let us say to the right—machine B is ahead of machine A less than one-half a period. If deflected in the other direction—that is, to the left—machine B is behind machine A less than one-half a period. If, therefore, the illumination of the synchronizing-lamps diminishes while the instrument is deflected to the right and increases while the instrument is deflected to the left, machine B is running more slowly than machine A. If, on the other hand, the lamps brighten while the deflection is to the right and become dim while the deflection is toward the left, machine B is running more rapidly than machine A. Thus simultaneous observations of lamps and instrument give a means of determining which machine is running the faster, there being no way of determining this with arrangements heretofore used.

Instead of connecting the phase-lamps for synchronizing dark, as is shown in the drawing, it is evident, of course, that they may be connected through suitable transformers in the ordinary manner for synchronizing bright. The particular manner of connecting the phase-lamps, however, forms no essential part of my present invention.

Having thus described my invention, what I claim as new, and desire to secure by Letters Patent of the United States, is—

1. In a synchronism-indicating means, the combination of an indicating device, and means for acting upon said device by two normally phase-displaced currents furnished respectively by machines to be synchronized.

2. In a synchronism-indicating means, the combination of an indicating device, and means for acting upon said device by two normally phase-displaced currents derived from different sources.

3. A means for indicating synchronism of alternating machines which consists of an indicating instrument, and means for acting upon said instrument by two normally phase-displaced currents, one of which is derived from one of the machines and the other from another machine.

4. A means for indicating synchronism of alternating machines which consists of an indicating instrument, and means for acting upon said instrument by two separate currents, one of which is derived from one phase of one of the machines and the other from a different phase of another machine.

5. A synchronism-indicating means consisting of a dynamometer having separate coils, means for feeding one of the coils with current of a given phase derived from a given source, and means for feeding another coil with current of a different phase derived from a different source.

6. A synchronism-indicating means consisting of a dynamometer having separate coils relatively movable under the influence of the dynamic effect of currents in said coils, means for feeding one of the coils with current of a given phase derived from a given dynamo-electric machine, and means for feeding another coil with current of a different phase derived from another machine.

7. A synchronism-indicating means for dynamo-electric machines consisting of an indicating instrument having separate coils, and means for feeding the respective coils with currents which are displaced in phase from each other when said machines are in synchronism.

8. A device for indicating synchronism of alternating-current machines, consisting of a dynamometer instrument, and means for feeding the coils of the instrument with currents displaced in phase from each other when the machines to be synchronized are in phase.

9. In a synchronism-indicator, two sources of alternating current, a voltage-indicator energized from said sources, and a phase-indicator comprising two coils one of which is movable relative to the other, one of said coils being supplied with current from one of said sources and the other of said coils being supplied with current from the other of said sources.

10. In a synchronism-indicator, two sources of alternating current, a voltage-indicator in series relation with said sources, and a phase-indicator comprising two coils one of which is movable relative to the other, one of said coils being supplied with current from one of said sources, and the other of said coils being supplied with current from the other of said sources.

In witness whereof I have hereunto set my hand this 27th day of July, 1900.

JONATHAN E. WOODBRIDGE.

Witnesses:
BENJAMIN B. HULL,
MABEL E. JACOBSON.